United States Patent [19]

Yada

[11] 4,300,862
[45] Nov. 17, 1981

[54] END MILLING TOOL

[75] Inventor: Hiroshi Yada, Yamatokoriyama, Japan

[73] Assignee: Dijet Industrial Co., Ltd., Osaka, Japan

[21] Appl. No.: 72,757

[22] Filed: Sep. 5, 1979

[51] Int. Cl.³ ............................................. B26D 1/12
[52] U.S. Cl. ................................................... 407/53
[58] Field of Search ............................ 407/54, 42, 53; 408/713, 230

[56] References Cited

U.S. PATENT DOCUMENTS

| | | | |
|---|---|---|---|
| 2,576,664 | 11/1951 | Berlien | 408/230 |
| 3,514,828 | 6/1970 | Wale | 407/54 |
| 3,963,365 | 6/1976 | Shallenberger | 408/713 |
| 4,132,493 | 1/1979 | Hosoi | 407/54 |

Primary Examiner—Leonidas Vlachos
Attorney, Agent, or Firm—Jordan and Hamburg

[57] ABSTRACT

An end milling tool has a main body formed at its front end with a long main cutting end edge extending generally radially from the outer periphery of the main body approximately to the center of the main body and with a short auxiliary cutting end edge extending from a different location on the outer periphery generally radially inwardly to a position spaced from the center. An outer peripheral cutting edge is formed at an outer peripheral portion of the main body and is continuous with each of the main and auxiliary cutting edges. The main cutting end edge projects axially of the main body beyond the auxiliary cutting end edge to prevent the auxiliary cutting end edge from breaking or chipping.

4 Claims, 4 Drawing Figures

END MILLING TOOL

BACKGROUND OF THE INVENTION

The present invention relates to improvements in an end milling tool adapted to cut workpieces through movement in its axial direction and to also effect sidewise cutting at right angles to the axis.

End mills of this type have a long main cutting end edge and a short auxiliary cutting end edge formed at the forward end of the mill so as to extend radially thereof and are also provided with outer axially extending peripheral cutting edges. The main and auxiliary cutting end edges drill or cut a workpiece in the direction of the axis of the mill, while the outer peripheral edges cut the workpiece sidewise, for example, to cut a side face thereof or form a groove therein. Since the main and auxiliary cutting end edges of the conventional end mills are positioned at the same axial location on the mill, such end edges are subjected to equal load when cutting in the axial direction. This gives rise to the problem that the short auxiliary cutting edge is liable to break or chip.

An object of the present invention is to reduce the cutting resistance to which the auxiliary cutting end edge is to be subjected to prevent the cutting edge from chipping or breaking.

Another object of the invention is to provide an end mill which is capable of smoothly cutting soft materials as well as hard materials.

Another object of the invention is to provide a drill having an increased life.

Other objects and features of the invention will become apparent from the following description with reference to the accompanying drawings, in which:

DESCRIPTION OF THE PREFERRED EMBODIMENTS

Figure 1:
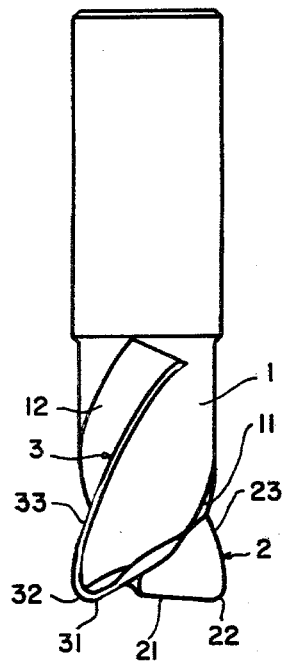
FIG. 1 is an elevational view showing one form of end mill embodying the features of the invention.
Figure 2:
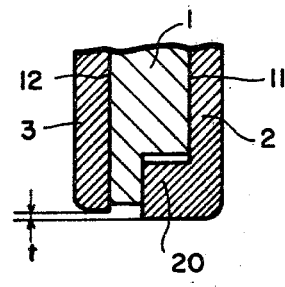
FIG. 2 is a fragmentary view in cross-section of the axial extremity of the end mill shown in FIG. 1 to show the tips as brazed in position.
Figure 3:
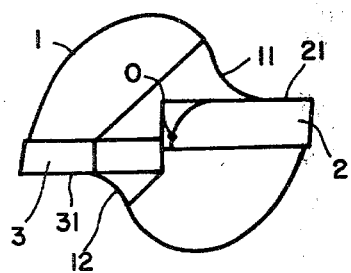
FIG. 3 is an enlarged bottom view of the end mill depicted in FIG. 1.

With reference to FIGS. 1 to 3, an end mill is shown having a main body 1 with twisted grooves 11 and 12 and formed in its outer periphery provided with blade tips 2 and 3 respectively, each positioned at one side of the associated groove. The tips are attached to the forward end of the main body as by brazing and are made of cemented carbide alloy. As seen in FIG. 2, the tip 3 has a relatively small width, while the tip 2 has a portion 20 of increased width only at its forward end. The axial extremity of the portion 20 projects beyond the axial extremity of the tip 3 by a distance t. The distance t is about 0.03 to 0.5 mm, preferably about 0.04 to 0.15 mm, more preferably about 0.05 to 0.08 mm, although for purposes of clarity distance t has been illustrated in FIG. 2 in magnified form.

The forward extremity of the tip 2 has a main generally radially extending cutting end edge 21 which is continuous with a generally axially extending cutting edge 23 formed on the outer periphery. The tip 3 has at its forward extremity a generally radially extending auxiliary cutting end edge 31 which is continuous with a generally axially extending cutting edge 33 formed on the outer periphery. Arcuate cutting corner edges 22 and 32 are formed at the junctions between the respective cutting end edges and outer peripheral cutting edges. The corner edges may be made straight, or the outer peripheral cutting edges and their associated cutting end edges may be made continuous with each other directly without providing the corner edges. The outer peripheral cutting edges, although twisted as seen in FIG. 1, may be straight edges extending upright axially of the main body. In fabricating the end mill the cutting edges are formed after the tips have been attached to the main body 1.

The main cutting end edge 21 extends from the outer periphery of the main body radially inwardly approximately to the center 0 of rotation of the end mill and has a large curvature in the vicinity of the center 0. The edge 21 is straight as it extends radially toward the outer periphery. The curved and straight portions of the cutting edge 21 extend outwardly away from a radial line extending from the center 0 when the tool is seen in its bottom view as shown in FIG. 3. The auxiliary cutting end edge 31 extends substantially straight from the outer periphery inwardly to a position spaced from the center 0 and also is spaced from a radial line extending from the center 0.

The cutting end edges 21 and 31 project forward slightly as they extend toward the outer periphery. Stated more specifically, the cutting edges 21 and 31 form an angle of about 1 to 3 degrees with respect to a phantom line at right angles with the axis of the main body 1 when the tool is seen in its side elevation. This angle can, however, be zero; in other words, the end edges may extend at right angles with the axis of the main body.

Figure 4:
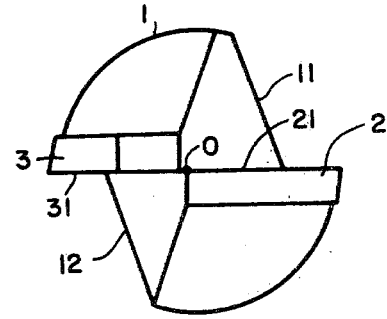
FIG. 4 is an enlarged bottom view similar to that of FIG. 3 showing another embodiment.

FIG. 4 shows another embodiment having a main cutting end edge 21 and an auxiliary cutting end edge 31 both of which extend radially from the center 0 in alignment with each other when the tool is seen in its bottom view. With this embodiment, each of the end edges is also continuous with an unillustrated outer peripheral cutting edge.

Although the cutting edges in the foregoing embodiments are substantially straight at the outer peripheral portions, the tips may be attached to the main body in an inclined position to render the straight portions curved when seen in a bottom view, such that the cutting edges are in the form of a curved line as a whole and have the largest curvature in the vicinity of the center 0. Although such modification is not illustrated, the cutting edges can be so shaped.

When the drill is used for cutting a workpiece, the main cutting end edge 21 and auxiliary cutting end edge 31 drill or cut the workpiece when the tool is moved axially, while the outer peripheral cutting edges cut the workpiece sidewise, for example, to cut a side face thereof. Since the main cutting end edge extends from the outer periphery to the center, the portion of the workpiece in the vicinity of the center of rotation can be completely cut when it is machined axially of the tool. The main cutting end edge, when provided with a large radius of curvature at the center 0, is subjected to smaller load per unit length of the edge than when the radially inner portion is straight. With the cutting edge inclined with respect to the direction of the advance effected by the rotation of the tool, the workpiece can be cut smoothly without permitting chips to adhere to the cutting edge. Accordingly the cutting edge in the center portion of the tool is less likely to chip or slip.

Because the main cutting end edge 21 is projected axially by a distance t beyond the auxiliary cutting end edge, the main edge cuts the workpiece to a greater depth when fed at a specified rate than that of the auxiliary edge which thereafter cuts the workpiece to a smaller depth as if by scraping. The auxiliary edge thus encounters reduced cutting resistance and is thereby prevented from chipping or breaking. Further when a backlash or jar occurs during the cutting operation owing to an error involved in mounting the tool or workpiece on the machine body, the distance t serves to absorb such jar, thus eliminating the excess load that otherwise would act on the auxiliary cutting edge. When a soft material is to be cut, the work surface will undergo elastic deformation while being cut by the main cutting end edge 21 and it will restore itself upon passage of the main edge to place a corresponding increased load on the auxiliary edge 31 when the edge 31 thereafter cuts the work. However, the distance t, if provided, absorbs some degree of the restoration and consequently assures a smooth cutting operation also for soft materials while protecting the auxiliary cutting edge from breaking or chipping.

Thus the present invention ensures an efficient cutting operation especially in the axial direction, affording an increased life for the tool by preventing breaking or chipping.

What is claimed is:

1. An end mill tool comprising:
   a main body terminating in a forward end;
   a main cutting end edge extending generally radially of said main body at said forward end from the outer periphery inwardly to approximately the axial center thereof;
   a relatively shorter auxiliary cutting end edge extending generally radially of said main body at said forward end from the outer periphery inwardly to a location spaced from the axial center thereof such that the outer radial portion of said main cutting end edge and the entire radial length of said auxiliary cutting end edge sweep a common overlapping outer radial path; and
   outer peripheral cutting edges formed at the outer peripheral portion of said main body continuous with said main and auxiliary cutting end edges;
   said main and auxiliary cutting end edges being constructed and arranged such that the entire radial length of said outer radial portion of said main cutting end edge which sweeps said common outer radial path projects axially forwardly of the entire radial length of said auxiliary cutting end edge such that said outer radial portion of said main cutting end edges cuts the workpiece to a greater depth than said auxiliary cutting end edge, whereby said auxiliary cutting end edge encounters less resistance and the likelihood of chipping or breaking of said auxiliary cutting end edge is reduced.

2. An end milling tool according to claim 1 wherein the entire length of said outer radial portion of said main cutting end edge projects axially forwardly of the entire length of said auxiliary cutting end edge.

3. An end milling tool according to claim 2 wherein said outer radial portion of said main cutting end edge and said auxiliary cutting end edge extend along generally straight lines.

4. An end milling tool according to claim 1, wherein said main cutting end edge is arcuate in the vicinity of the axial center of said main body when viewed endwise.

* * * * *